5 Sheets—Sheet 1.

C. A. HOTCHKISS.
CURRY-COMB.

No. 175,097.  Patented March 21, 1876.

WITNESSES
Robert Everett
C. H. Searle

INVENTOR.
Charles A. Hotchkiss.
Gilmore, Smith & Co.
ATTORNEYS.

N. PETERS, PHOTO-LITHOGRAPHER, WASHINGTON, D. C.

C. A. HOTCHKISS.
CURRY-COMB.

No. 175,097. Patented March 21, 1876.

5 Sheets—Sheet 3.

C. A. HOTCHKISS.
CURRY-COMB.

No. 175,097. Patented March 21, 1876.

WITNESSES
Robert Everett
George W. Larner

INVENTOR,
Charles A. Hotchkiss.
Gilmore, Smith & Co.
ATTORNEYS

C. A. HOTCHKISS.
CURRY-COMB.
No. 175,097. Patented March 21, 1876.
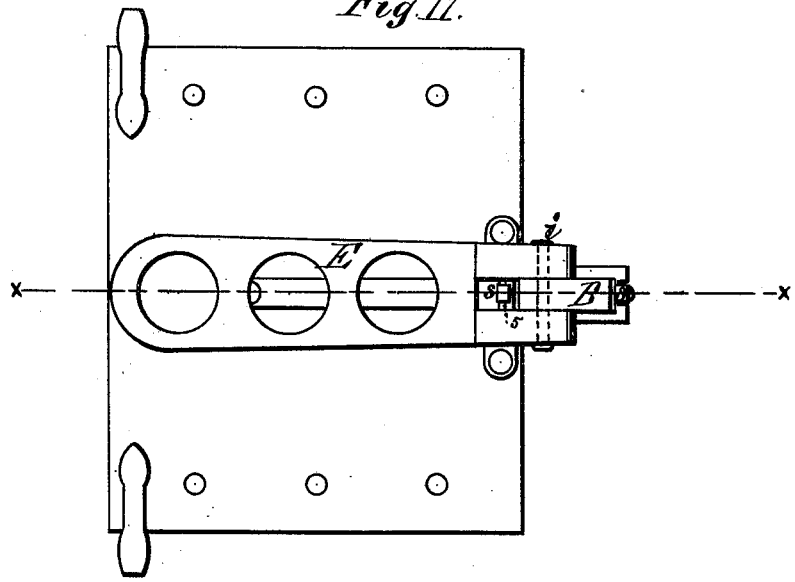
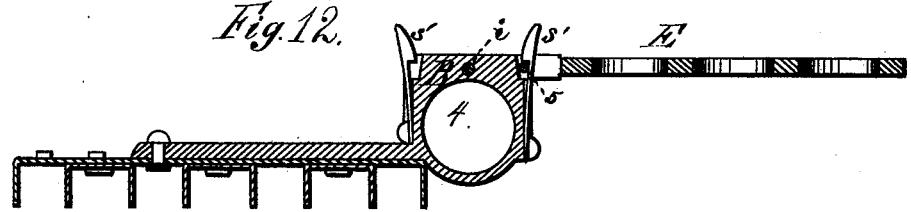
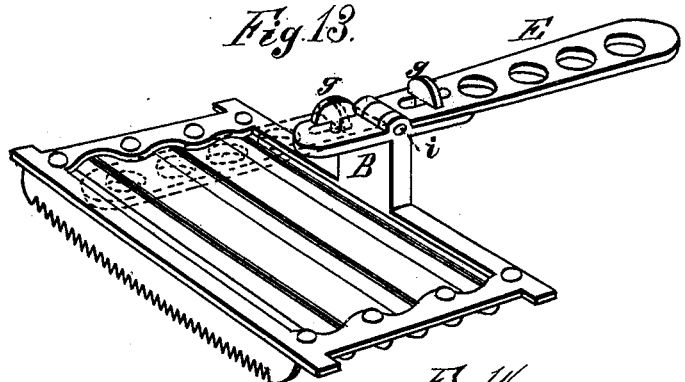
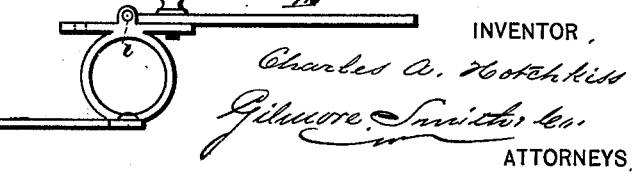
WITNESSES
Robert Everett
C. W. Searle
INVENTOR
Charles A. Hotchkiss
Gilmore Smith &c.
ATTORNEYS 5 Sheets—Sheet 5.

C. A. HOTCHKISS.
CURRY-COMB.

No. 175,097. Patented March 21, 1876.

UNITED STATES PATENT OFFICE.

CHARLES A. HOTCHKISS, OF BRIDGEPORT, CONNECTICUT.

IMPROVEMENT IN CURRY-COMBS.

Specification forming part of Letters Patent No. 175,097, dated March 21, 1876; application filed March 15, 1876.

*To all whom it may concern:*

Be it known that I, CHAS. A. HOTCHKISS, of Bridgeport, in the county of Fairfield and State of Connecticut, have invented a new and valuable Improvement in Curry-Combs; and I do hereby declare that the following is a full, clear, and exact description of the construction and operation of the same, reference being had to the annexed drawings making a part of this specification, and to the letters and figures of reference marked thereon.

Figure 1:
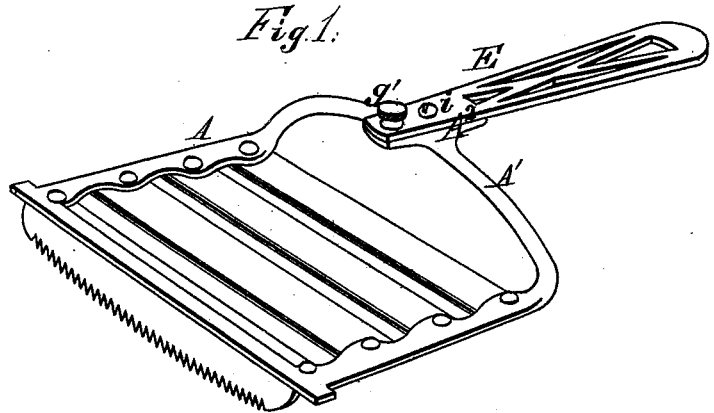
Figure 2:
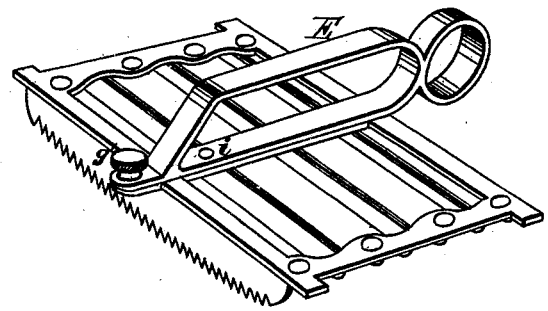
Figure 3:
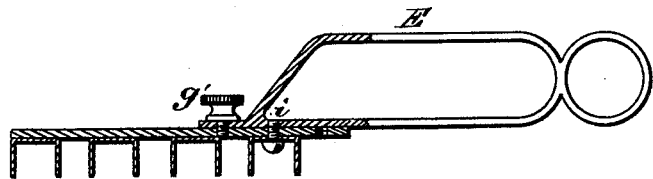
Figure 4:
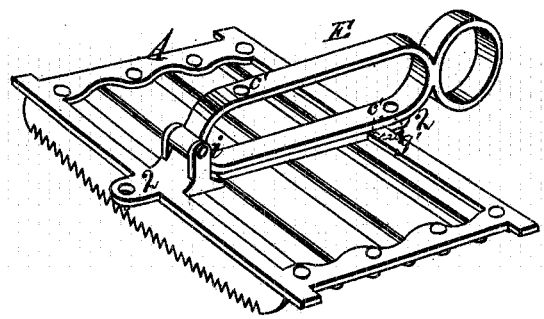
Figure 5:
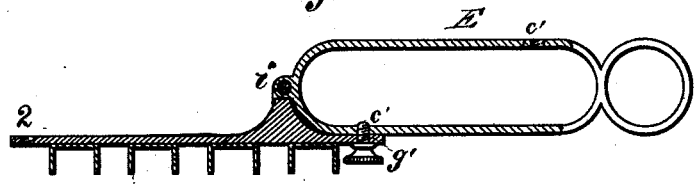
Figure 6:
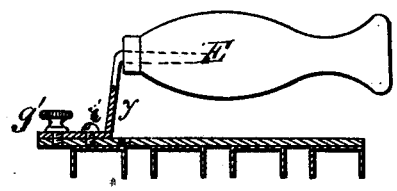
Figure 7:
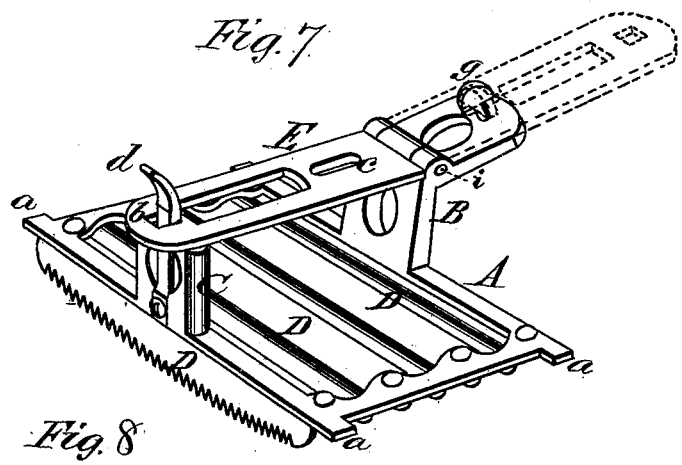
Figure 8:
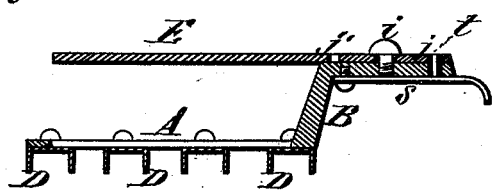

Figure 1 of the drawings is a representation of a perspective view of my curry-comb, and Fig. 2 is a perspective view of a modification thereof. Fig. 3 is a side view, part sectional, thereof. Fig. 4 is a perspective view of a modification, of which Fig. 5 is a vertical transverse sectional view. Fig. 6 is a sectional view. Fig. 7 is a modification. Fig. 8 is a transverse vertical sectional view of the modification shown in Fig. 9. Figs. 10, 11, 12, 13, 14, 15, and 16 are modifications of my device.

This invention has relation to curry-combs which have handles that are adjustable over their backs, or on one side thereof; and the nature of my invention consists in a curry-comb having its handle pivoted to the back or frame in such manner that it can be readily adjusted and rigidly fixed over or across the back of the comb, or fixed so as to extend out to one side of the comb, as will be hereinafter explained.

Fig. 1 of the annexed drawings illustrates a frame, A, having comb-teeth suitably secured to it. A portion of this frame is arched, as indicated by the letter $A^1$, and at the highest part of this arch a flat table, $A^2$, is formed, to which a handle, E, is attached by means of a pivot, $i$, and rigidly secured by a set-screw, $g'$. By removing the screw $g'$, the handle E can be turned about the pivot $i$, and adjusted in any position desired. Holes are made in the table $A^2$ to receive the screw $g'$, in whatever position the handle may be placed.

Figs. 2 and 3 show a looped grasping-handle, which has a thumb-ring on one end. This handle is pivoted at $i$ to the comb-frame, and rigidly held over the back of the comb, as shown by Fig. 2; or on one side thereof, as shown in Fig. 3, by means of a thumb-screw, $g'$.

Figs. 4 and 5 show a curry-comb having a looped handle, on one end of which a thumb-ring may be formed. This open handle is pivoted or hinged at $i$, and perforated at $c' c'$, and the frame or comb-back is constructed with extensions 2 2, which are also perforated to receive a thumb-screw, $g'$. The perforations through the handle are so arranged with respect to the holes through the extensions 2 2 that the handle can be adjusted and secured, as shown in Fig. 4; or it can be adjusted and rigidly secured, as shown in Fig. 5.

Fig. 6 shows a curry-comb having a wooden handle, the tang of which is bent so as to form a foot-piece, $y$, which is secured to the comb frame or back by means of a pivot, $i$, and a thumb-screw, $g'$. There are two screw-tapped holes made for the screw $g'$, which are equidistant from the pivot $i$. This is done for the purpose of allowing the handle to be fixed over the back of the comb, or on one side thereof. The figure (6) shows the handle fixed over the back of the comb.

Fig. 7 shows a comb the blades D of which are secured to a frame, A, having knockers $a$ and posts B C formed on it. The handle E of this comb is pivoted or hinged at $i$, and the post B is constructed with a shelf or rest, 3, on which the handle is supported when it is adjusted on one side of the comb, as indicated in dotted lines in Fig. 7. A turn-button, $g$, holds the handle rigidly in place on the shelf 3. When the handle E is adjusted over the back of the comb, as indicated by full lines, it is rigidly held by a spring-latch, $d$, which passes through a perforation, $b$, made through the free end of the handle. The oblong slot $c$ is designed to receive through it the button $g$.

Figure 9:
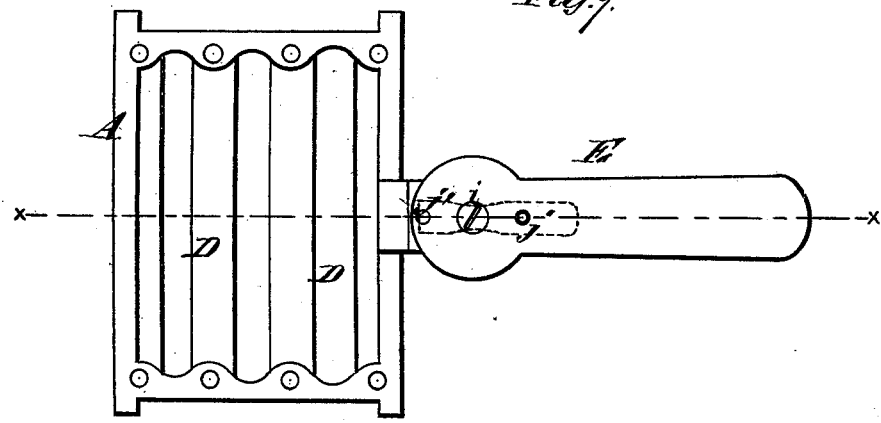

In Figs. 8 and 9 I show a curry-comb having a handle, E, which is laterally adjustable about a pivot, $i$, and which can be rigidly fixed in either of the two positions shown by means of a catch pin, $t$, on a finger-spring, $s$, which pin will enter one or the other of two holes, $j\,j'$.

Figure 10:
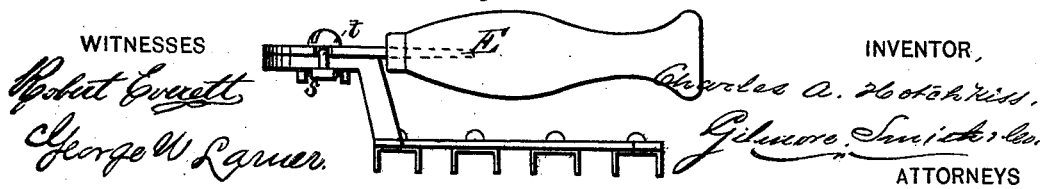

Instead of perforating the circular enlargement on the handle or tang of the handle, notches may be formed in the periphery of this enlargement adapted to receive a pin, $t$, on a finger-spring, $s$, as shown in Fig. 10. This modification allows the handle to be adjusted laterally, and fixed over the back of the comb or on one side thereof.

In Figs. 11 and 12 I show my invention applied to a close-back curry-comb, in which the post B has an opening, 4, through it to receive the thumb of the hand which grasps the handle E. This handle is adjustable about a pivot, $i$, like the handles of the combs represented by Figs. 4, 5, and 7. The bifurcated end of the handle E is pivoted to the upper shouldered portion of the ring-post B, and is provided with a cross-pin, 5, which will be caught by one or the other of two spring-latches, $s'$ $s'$, when the handle is adjusted in the desired position. Fig. 11 shows the handle adjusted and fixed over the back of the comb in a position to be used as a grasping-handle; and Fig. 12 shows the same comb with the handle adjusted on one side of the same.

Figure 15:
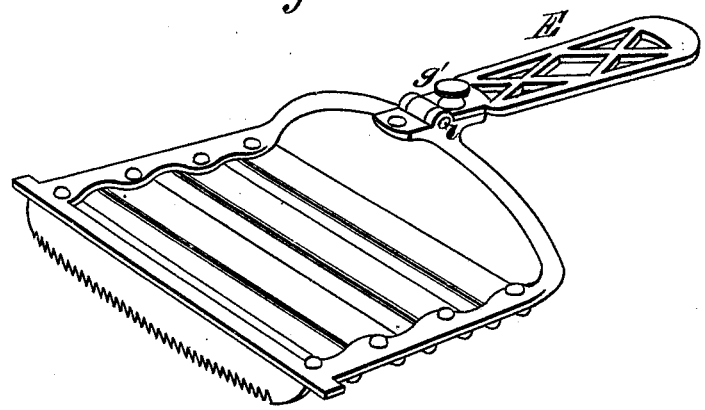

The combs shown by Figs. 13, 14, and 15 have a table or support formed on the post or arch B, on each side of the pivot $i$, which connects the handle to it. In the comb of Fig. 13 the handle is secured by means of buttons $g$ $g$, and in the comb represented by Figs. 14 and 15, the handle is secured by a thumb-screw, $g'$.

Figure 16:
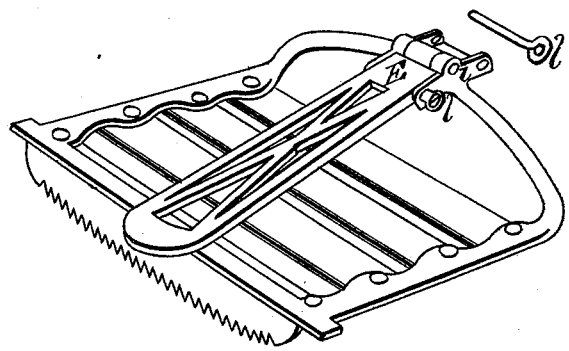

Fig. 16 shows a curry-comb the handle of which is pivoted at $i$, and can be fixed in the position shown; or it can be fixed for use as a side handle by means of a pin, $l$. This handle is sustained in an inclined position when it is adjusted over the back of the comb, and may be used as a grasping-handle, or as a palm-rest for the hand.

It will be seen from the above description that all of the combs represented have handles which are adjustable about a pivot. Some of the handles are adjustable laterally, or in the plane of the comb-back, and some are adjustable at right angles thereto.

Several kinds of fastenings are shown; but I do not confine myself to these fastenings, as many other devices may be used for fixing the handles when they are properly adjusted. I also desire to state that wherever wooden handles are applicable I may use them.

What I claim as new, and desire to secure by Letters Patent, is—

A curry-comb having a handle pivoted to it in such manner that it is adjustable for a side handle or grasping-handle over the back of the comb, substantially as described.

In testimony that I claim the above I have hereunto subscribed my name in the presence of two witnesses.

C. A. HOTCHKISS.

Witnesses:
JOHN F. ACKER, Jr.,
ROBERT EVERETT.